United States Patent
Fujisaki et al.

(10) Patent No.: US 9,484,839 B2
(45) Date of Patent: Nov. 1, 2016

(54) POWER CONVERTER, POWER GENERATING SYSTEM, APPARATUS FOR CONTROLLING POWER CONVERTER, AND METHOD FOR CONTROLLING POWER CONVERTER

(71) Applicant: KABUSHIKI KAISHA YASKAWA DENKI, Kitakyushu-shi (JP)

(72) Inventors: Seiji Fujisaki, Fukuoka (JP); Mamoru Takaki, Fukuoka (JP); Shinya Morimoto, Fukuoka (JP); Masato Higuchi, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 155 days.

(21) Appl. No.: 14/608,190

(22) Filed: Jan. 29, 2015

(65) Prior Publication Data

US 2015/0270787 A1 Sep. 24, 2015

(30) Foreign Application Priority Data

Mar. 18, 2014 (JP) ................................ 2014-055400

(51) Int. Cl.
*H02M 7/5387* (2007.01)
*G05F 1/563* (2006.01)
*G05F 1/61* (2006.01)
*H02M 1/08* (2006.01)
*H02M 1/12* (2006.01)
*H02M 3/158* (2006.01)
*H02M 1/00* (2006.01)

(52) U.S. Cl.
CPC .......... *H02M 7/53871* (2013.01); *G05F 1/563* (2013.01); *G05F 1/61* (2013.01); *H02M 1/08* (2013.01); *H02M 1/126* (2013.01); *H02M 3/158* (2013.01); *H02M 7/5387* (2013.01); *H02M 2001/007* (2013.01); *H02M 2001/0054* (2013.01); *Y02B 70/1491* (2013.01)

(58) Field of Classification Search
None
See application file for complete search history.

(56) References Cited

U.S. PATENT DOCUMENTS

| 2005/0068001 | A1* | 3/2005 | Skaug ..................... F04C 28/08 318/807 |
| 2012/0075900 | A1* | 3/2012 | Nakagawa ........ H02M 7/53875 363/132 |
| 2012/0155126 | A1* | 6/2012 | Yoneda ................... H02J 3/383 363/40 |
| 2012/0201064 | A1 | 8/2012 | Asakura et al. |
| 2012/0320641 | A1* | 12/2012 | Chapman ................ H02J 3/383 363/37 |

FOREIGN PATENT DOCUMENTS

| JP | 2000-152661 | 5/2000 |
| WO | WO 2013/069326 | 5/2013 |

OTHER PUBLICATIONS

Extended European Search Report for corresponding EP Application No. 15152604.3-1809, Aug. 11, 2015.
Ahmed et al., "Dual-mode time-sharing one-stage single-phase power conditioner using sinewave tracked soft switching PWM boost chopper", Conference Record of the 2005 IEEE Industry Applications Conference Fortieth IAS Annual Meeting Oct. 2-6, 2005 Kowloon, Hong Kong, China, IEEE, Conference Record of the 2005 IEEE Industry Applications Conference Fortieth IAS Annual Meeting, Oct. 2, 2005, pp. 1612-1617, vol. 3.

* cited by examiner

*Primary Examiner* — Jeffrey Gblende
(74) *Attorney, Agent, or Firm* — Mori & Ward, LLP (57) ABSTRACT

A power converter according to one embodiment includes a controller that switches between a boosting operation in a boost circuit and a pulse-width modulation operation in a single-phase inverter. The controller modifies an output from a voltage detection filter based on a delay compensating value for compensating a detection delay introduced by the voltage detection filter, when switching is performed the boosting operation in the boost circuit to the PWM operation in the single-phase inverter.

12 Claims, 8 Drawing Sheets

POWER CONVERTER, POWER GENERATING SYSTEM, APPARATUS FOR CONTROLLING POWER CONVERTER, AND METHOD FOR CONTROLLING POWER CONVERTER

CROSS-REFERENCE TO RELATED APPLICATION

This application is based upon and claims the benefit of priority of the prior Japanese Patent Application No. 2014-055400, filed on Mar. 18, 2014, the entire contents of which are incorporated herein by reference.

FIELD

The embodiments discussed herein are directed to a power converter, a power generating system, an apparatus for controlling a power converter, and a method for controlling a power converter.

BACKGROUND

Conventionally known are power converters that include a boost circuit and a single-phase inverter, and in which the single-phase inverter outputs an alternating-current (AC) voltage with a higher amplitude than that of a direct-current (DC) power source, by causing the boost circuit to boost the voltage of the DC power source.

Disclosed for such a power converter is a technology that performs the control for the boosting operation in the boost circuit and the control for the pulse-width modulation (PWM) in the single-phase inverter alternatingly, so as to cause the single-phase inverter to output an AC voltage. Such a power converter causes the single-phase inverter to generate a part of the AC voltage waveform in which the absolute value of the voltage is lower than the DC power source voltage, and causes the boost circuit to generate a part of the AC voltage waveform in which the absolute value of the voltage is higher than the DC power source voltage (see International Publication WO 2013/069326, for example).

In such a power converter, however, there are some cases in which the PWM in the single-phase inverter is controlled based on the voltage output from the boost circuit to the single-phase inverter. In such a case, if there is a delay in the detection of the output voltage, the AC voltage output from the single-phase inverter may become distorted at the timing at which the control is switched from the boosting operation in the boost circuit to the PWM operation in the single-phase inverter.

SUMMARY

A power converter according to an aspect of embodiments includes a boost circuit, a single-phase inverter, and a controller. The boost circuit boosts a voltage of a direct-current (DC) power source. The single-phase inverter converts a voltage output from the boost circuit into an alternating-current (AC) voltage, and outputs the AC voltage. The controller includes a voltage detection filter and a detected voltage modifying unit. The voltage detection filter removes a noise component from a detection result of a voltage detector which detects the output voltage of the boost circuit. The detected voltage modifying unit modifies an output from the voltage detection filter based on a delay compensating value for compensating a detection delay introduced by the voltage detection filter, when switching is performed from the boosting operation in the boost circuit to the PWM operation in the single-phase inverter.

BRIEF DESCRIPTION OF DRAWINGS

The following description with reference to the accompanying drawings will assist in a comprehensive understanding of exemplary embodiments and their advantages.

DESCRIPTION OF EMBODIMENTS

Some embodiments of a power converter, a power generating system, an apparatus for controlling a power converter, and a method for controlling a power converter will now be explained in detail with reference to the appended drawings. The embodiments described below are not intended to limit the scope of the present invention in any way. For example, in the description below, a solar cell is used as an example of a direct-current (DC) power source and a power generator, but the DC power source and the power generator may be a DC power generator or a fuel cell, without limitation to a solar cell. Furthermore, the DC power source may be, for example, an alternating-current (AC) power source (including an AC power generator) provided with a converter, and in which the converter converts the AC power from the AC power source into a DC power and outputs the DC power.

1. First Embodiment

Figure 1:
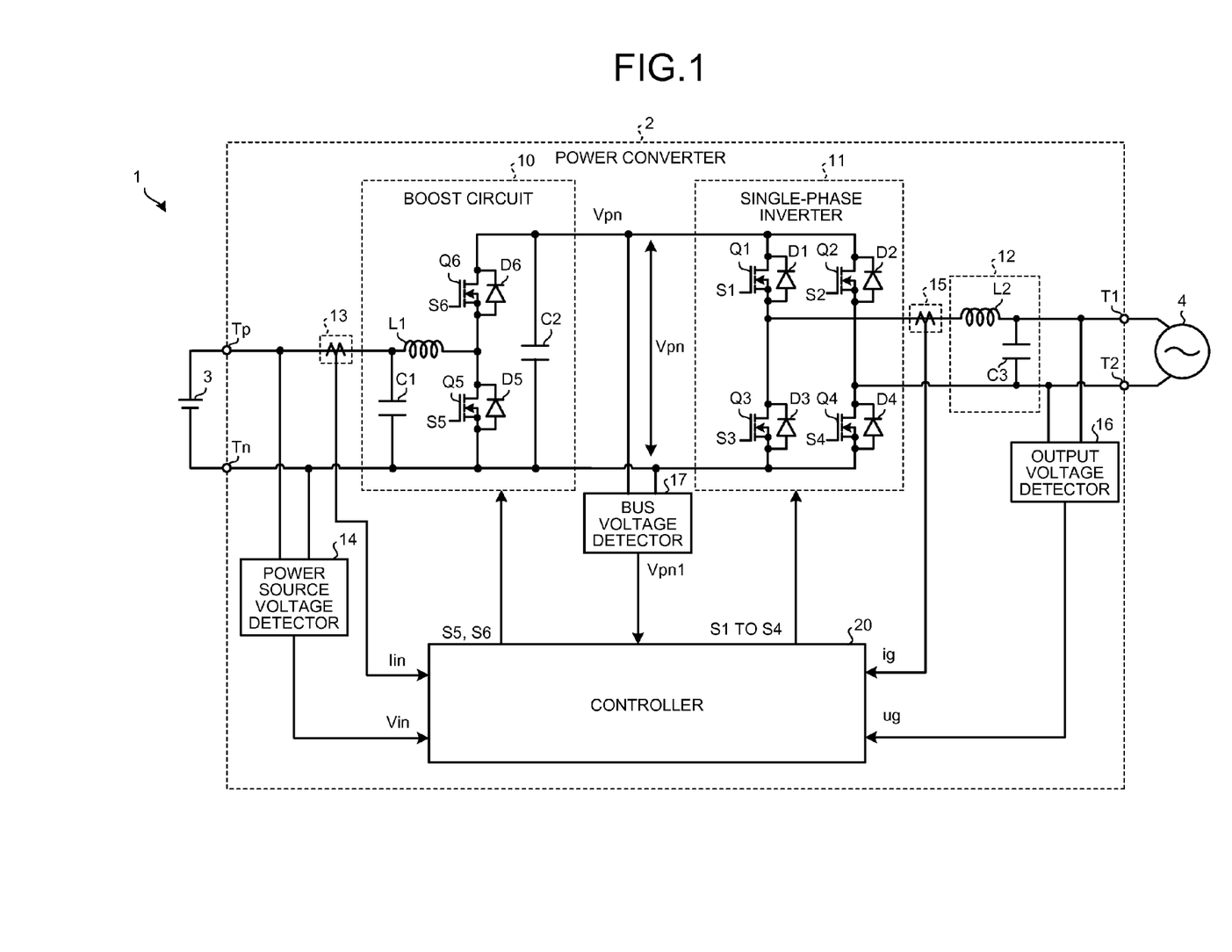
FIG. 1 is a schematic illustrating an example of a configuration of a power generating system according to a first embodiment.

FIG. 1 is a schematic illustrating an example of a configuration of a power generating system according to a first embodiment. As illustrated in FIG. 1, the power generating system 1 according to the first embodiment includes a power converter 2 and a solar cell 3. The power converter 2 converts the DC power generated by the solar cell 3 into AC power, and outputs the AC power to an electrical grid 4. In the example illustrated in FIG. 1, the power converter 2 is connected to the electrical grid 4, but the power converter 2 may be connected to any load, without limitation to the electrical grid 4, e.g., a device operating with the AC power.

1.1. Power Converter 2

The power converter 2 includes input terminals Tp and Tn, output terminals T1 and T2, a boost circuit 10, a single-phase inverter 11, an output filter 12, a power source current detector 13, a power source voltage detector 14, an output current detector 15, an output voltage detector 16, a bus voltage detector 17, and a controller 20 (an example of a controller and an apparatus for controlling a power converter).

The input terminal Tp is connected to the cathode of the solar cell 3, and the input terminal Tn is connected to the anode of the solar cell 3. The output terminals T1 and T2 are connected to the electrical grid 4. The boost circuit 10 and the single-phase inverter 11 convert the DC voltage input from the solar cell 3, being input via the input terminals Tp and Tn, into an AC voltage, and the AC voltage after the conversion is output from the output terminals T1, T2 to the electrical grid 4.

The boost circuit 10 includes switching elements Q5 and Q6, diodes D5 and D6, a reactor L1, and capacitors C1 and C2. One end of the reactor L1 is connected to the solar cell 3.

The switching element Q5 is connected in parallel between the cathode and the anode of the solar cell 3, via the reactor L1. The diode D5 is connected in anti-parallel with the switching element Q5. One end of the switching element Q6 is connected to the connection point between the reactor L1 and the switching element Q5, and the other end is connected to the single-phase inverter 11. The diode D6 is connected in anti-parallel with the switching element Q6.

The capacitor C1 is connected between the cathode and the anode of the solar cell 3, and controls the voltage fluctuation between the input terminals Tp and Tn. A capacitor C2 is connected to the output end of the boost circuit 10, and smoothes out the voltage boosted by the reactor L1 and the switching element Q5.

The boost circuit 10 outputs a boosted voltage from the switching element Q6 by controlling to switch ON and OFF the switching elements Q5 and Q6 alternatingly, boosting the DC voltage input from the solar cell 3 via the input terminals Tp and Tn thereby. The boost circuit 10 outputs the DC voltage input from the solar cell 3 via the input terminals Tp and Tn from the switching element Q6, by controlling to switch OFF the switching element Q5 and to switch ON the switching element Q6.

In the manner described above, the boost circuit 10 is capable of boosting the DC voltage output from the solar cell 3, and of outputting the DC voltage output from the solar cell 3 without boosting. In the explanation hereunder, the voltage at the connection point between the boost circuit 10 and the single-phase inverter 11, that is, the voltage output from the boost circuit 10 and input to the single-phase inverter 11 is referred to as a bus voltage Vpn.

The single-phase inverter 11 includes switching elements Q1 to Q4 that are bridge-connected, and switching elements Q1 to Q4 connected in anti-parallel with the respective diodes D1 to D4. The single-phase inverter 11 converts the bus voltage Vpn to a positive AC voltage by controlling to switch ON and OFF the switching element Q1 and Q4, and converts the bus voltage Vpn to a negative AC voltage by controlling to switch ON and OFF the switching elements Q2 and Q3.

The single-phase inverter 11 outputs the bus voltage Vpn as a positive voltage by controlling to switch ON the switching elements Q1 and Q4, and outputs the bus voltage Vpn as a negative voltage by controlling to switch ON the switching elements Q2 and Q3. In the manner described above, the single-phase inverter 11 is capable of converting the bus voltage Vpn into an AC voltage, and of outputting the bus voltage Vpn without converting.

The switching elements Q1 to Q6 are made of a wide-bandgap semiconductor containing gallium nitride (GaN) or silicon carbide (SiC), for example. The switching elements Q1 to Q6 may also be metal-oxide-semiconductor field-effect transistors (MOSFETs) or insulated gate bipolar transistors (IGBTs).

The output filter 12 is a LC filter including a reactor L2 and capacitor C3, for example, and is provided between the single-phase inverter 11 and the electrical grid 4. The output filter 12 removes the switching noise introduced by the switching elements Q1 to Q4 in the single-phase inverter 11.

The power source current detector 13 detects an instantaneous current Iin of the DC supplied from the solar cell 3 to the boost circuit 10 (hereinafter, sometimes referred to as a power source current Iin). The power source voltage detector 14 detects the instantaneous value Vin of the DC voltage supplied from the solar cell 3 (hereinafter, sometimes referred to as a power source voltage Vin). The power source current detector 13 uses a Hall element, for example, that is a magneto-electric transducer in detecting the current.

The output current detector 15 detects an instantaneous value ig of the AC supplied from the power converter 2 to the electrical grid 4 (hereinafter, sometimes referred to as an output current ig). The output voltage detector 16 detects an instantaneous value ug of the AC voltage supplied from the power converter 2 to the electrical grid 4 (hereinafter, sometimes referred to as an output voltage ug). The output current detector 15 uses a Hall element, for example, that is a magneto-electric transducer in detecting the current.

The bus voltage detector 17 detects an instantaneous value of the bus voltage Vpn (hereinafter, sometimes referred to as bus voltage Vpn1) output from the boost circuit 10 to the single-phase inverter 11.

The controller 20 outputs gate signals S1 to S6 for controlling the boost circuit 10 and the single-phase inverter 11 based on the power source voltage Vin, the power source current Iin, the output current ig, the output voltage ug, and the bus voltage Vpn1. The gate signals S1 to S6 are input to the gates of the respective switching elements Q1 to Q6, to control the switching elements Q1 to Q6, respectively.

The controller 20 includes a microcomputer and various circuits, including a central processing unit (CPU), a read-only memory (ROM), a random access memory (RAM), and an input/output port, for example. The CPU in the microcomputer included in the controller 20 implements the control to be described later by reading the computer program stored in the ROM and executing the computer program, for example. A specific example of a configuration of the controller 20 will now be explained with reference to some drawings.

1.2. Configuration of Controller 20

Figure 2:
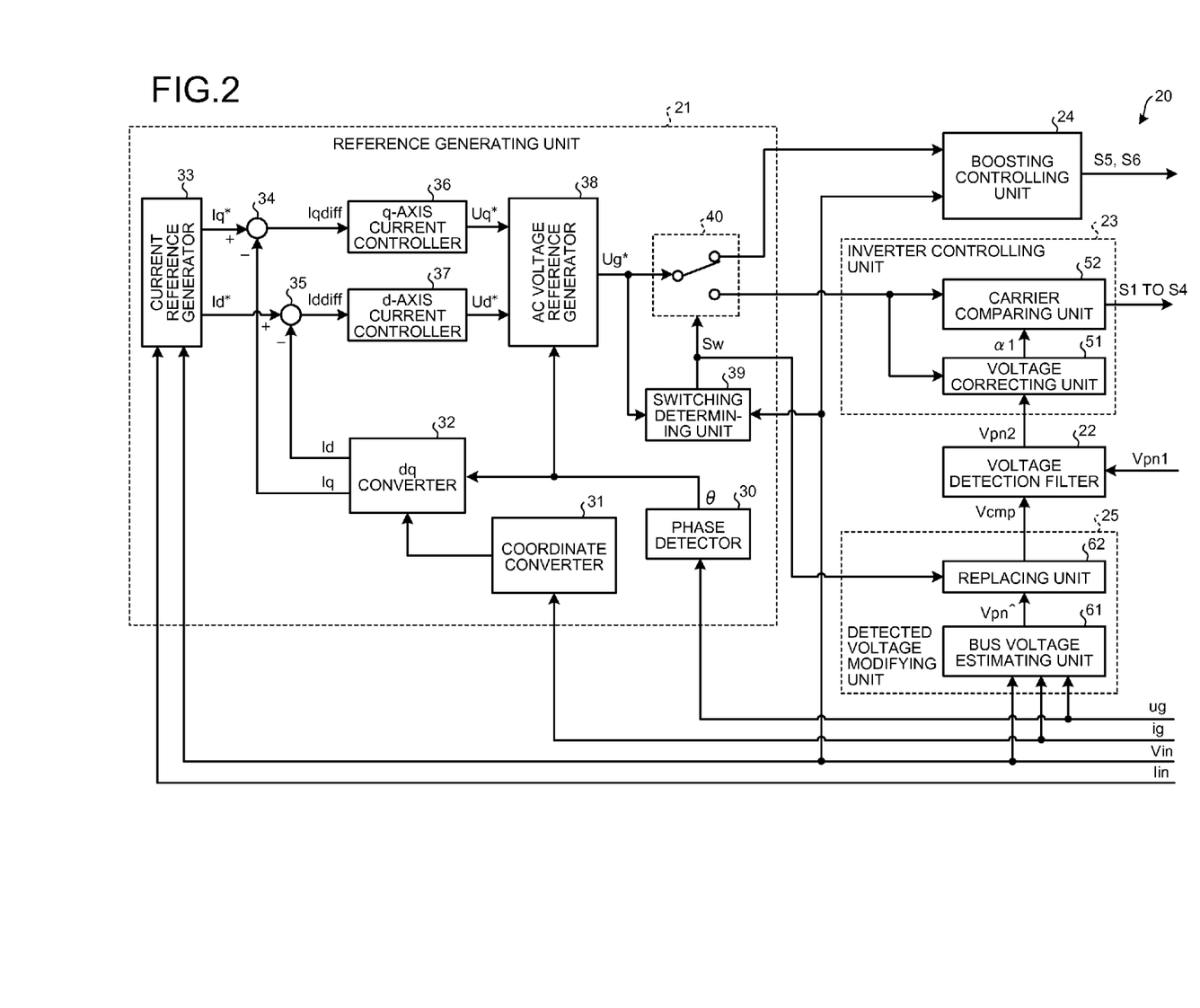
FIG. 2 is a schematic illustrating an example of a configuration of a controller included in the power converter.

FIG. 2 is a schematic illustrating an example of a configuration of the controller 20. As illustrated in FIG. 2, the controller 20 includes a reference generating unit 21, a voltage detection filter 22, an inverter controlling unit 23, a boosting controlling unit 24, and a detected voltage modifying unit 25. The functions of the reference generating unit 21, the voltage detection filter 22, the inverter controlling unit 23, the boosting controlling unit 24, and the detected voltage modifying unit 25 are implemented by causing the CPU to read and to execute a computer program, for example.

At least some or all of the reference generating unit 21, the voltage detection filter 22, the inverter controlling unit 23, the boosting controlling unit 24, and the detected voltage modifying unit 25 may be implemented as an integrated circuit such as an application specific integrated circuit (ASIC) or a field programmable gate array (FPGA).

1.2.1. Reference Generating Unit 21

The reference generating unit 21 generates an AC voltage reference Ug* for maximizing the power supplied from the solar cell 3 to the boost circuit 10, based on the power source current Iin received from the power source current detector 13 and the power source voltage Vin received from the power source voltage detector 14. To maximize the power, the reference generating unit 21 outputs the AC voltage reference Ug* to the inverter controlling unit 23 or to the boosting controlling unit 24 based on a relation between the AC voltage reference Ug* and the power source voltage Vin.

When the absolute value of the AC voltage reference Ug* is equal to or lower than the power source voltage Vin, the reference generating unit 21 outputs the AC voltage reference Ug* to the inverter controlling unit 23. When the absolute value of the AC voltage reference Ug* is higher than the power source voltage Vin, the reference generating unit 21 outputs the AC voltage reference Ug* to the boosting controlling unit 24.

The reference generating unit 21 includes a phase detector 30, a coordinate converter 31, a dq converter 32, a current reference generator 33, subtractors 34 and 35, a q-axis current controller 36, a d-axis current controller 37, an AC voltage reference generator 38, a switching determining unit 39, and a switching unit 40.

The phase detector 30 detects a phase θ of the output voltage ug to be supplied from the power converter 2 to the electrical grid 4 (hereinafter, referred to as an output voltage phase θ). The phase detector 30 is configured as a phase locked loop (PLL), for example. The output voltage ug corresponds to the voltage of the electrical grid 4.

The coordinate converter 31 converts the output current ig to be supplied from the single-phase inverter 11 to the electrical grid 4 into a pair of signals orthogonally intersecting with each other in an orthogonal coordinate system. For example, the coordinate converter 31 generates a first signal synchronized with the phase of the output current ig, and a second signal delayed by 90 degrees with respect to the phase of the output current ig, based on the output current ig.

The dq converter 32 performs a coordinate conversion of the first and the second signals generated by the coordinate converter 31, into dq components in a dq coordinate system, based on the output voltage phase θ. As a result of this process, the dq converter 32 obtains a current Id of the d-axis component (hereinafter, referred to as a d-axis current Id) and a current Iq of the q-axis component (hereinafter, referred to as a q-axis current Iq). The q-axis current Iq corresponds to an active component of the output current ig, and the d-axis current Id corresponds to a reactive component of the output current ig.

The current reference generator 33 generates a current reference i* for maximizing the power supplied from the solar cell 3 to the boost circuit 10 based on the power source voltage Vin and the power source current Iin. The current reference i* has a q-axis current reference Iq* as a q-axis component, and has a d-axis current reference Id* as a d-axis component. The q-axis current reference Iq* is a reference corresponding to the active component of the output current ig, and the d-axis current reference Id* is a reference corresponding to the reactive component of the output current ig.

The subtractor 34 subtracts the q-axis current Iq from the q-axis current reference Iq* to obtain a q-axis current deviation Iqdiff, and outputs the q-axis current deviation Iqdiff to the q-axis current controller 36. The q-axis current controller 36 adjusts a q-axis AC voltage reference Uq* in such a manner that the q-axis current deviation Iqdiff becomes zero, by performing proportional-integral (PI) control, for example, and outputs the q-axis AC voltage reference Uq* to the AC voltage reference generator 38.

The subtractor 35 subtracts the d-axis current Id from the d-axis current reference Id* to obtain a d-axis current deviation Iddiff, and outputs the d-axis current deviation Iddiff to the d-axis current controller 37. The d-axis current controller 37 adjusts a d-axis AC voltage reference Ud* in such a manner that the d-axis current deviation Iddiff becomes zero, by performing PI control, for example, and outputs the d-axis AC voltage reference Ud to the AC voltage reference generator 38.

The AC voltage reference generator 38 generates the AC voltage reference Ug* based on the q-axis AC voltage reference Uq*, the d-axis AC voltage reference Ud*, and the output voltage phase θ. For example, the AC voltage reference generator 38 calculates an amplitude M of the AC voltage reference Ug* using following Equation (1), and calculates a phase θa using following Equation (2). The AC voltage reference generator 38 then calculates a phase θv of the AC voltage reference Ug* by adding the phase θa to the output voltage phase θ, for example. The AC voltage reference generator 38 generates the AC voltage reference Ug* (=M×sin θv) by calculating M×sin θv, for example.

$$M = \sqrt{Ud^{*2} + Uq^{*2}} \quad (1)$$

$$\theta a = \tan^{-1}(Uq^*/Ud^*) \quad (2)$$

The switching determining unit 39 determines if the absolute value of the AC voltage reference Ug* is equal to or lower than the power source voltage Vin. If the switching determining unit 39 determines that the absolute value of the AC voltage reference Ug* is equal to or lower than the power source voltage Vin, the switching determining unit 39 outputs a Low-level switching signal Sw. If the switching determining unit 39 determines that the absolute value of the AC voltage reference Ug* is higher than the power source voltage Vin, the switching determining unit 39 outputs a High-level switching signal Sw.

The switching unit 40 outputs the AC voltage reference Ug* either to the inverter controlling unit 23 or to the boosting controlling unit 24 based on the switching signal Sw. If the switching signal Sw is set to the Low level, the switching unit 40 outputs the AC voltage reference Ug* to the inverter controlling unit 23. If the switching signal Sw is set to the High level, the switching unit 40 outputs the AC voltage reference Ug* to the boosting controlling unit 24.

The switching determining unit 39 may have any other configuration without limitation to the configuration illustrated in FIG. 2. For example, the switching unit 40 may not be provided, and the AC voltage reference Ug* may be input to the inverter controlling unit 23 and to the boosting controlling unit 24. The switching determining unit 39 may then select which one of the inverter controlling unit 23 and the boosting controlling unit 24 to operate.

In such a configuration, the inverter controlling unit 23 performs the control for the PWM operation in the single-phase inverter 11 if the switching signal Sw is set to the Low level, and does not perform the control for the PWM operation in the single-phase inverter 11 if the switching signal Sw is set to the High level. The boosting controlling unit 24 does not perform the control for the boosting operation in the boost circuit 10 if the switching signal Sw is set to the Low level, and performs the controls for the boosting operation in the boost circuit 10 if the switching signal Sw is set to the High level.

The reference generating unit 21 may also have any other configuration without limitation to the configuration illustrated in FIG. 2. For example, the reference generating unit 21 may be provided with a reference generating unit for generating the AC voltage reference Ug* for the inverter controlling unit 23, and another reference generating unit for generating the AC voltage reference Ug* for the boosting controlling unit 24, separately.

1.2.2. Voltage Detection Filter 22

The voltage detection filter 22 removes a noise component from the bus voltage Vpn1 that is the detection result from the bus voltage detector 17 (see FIG. 1). The voltage detection filter 22 is a low-pass filter, for example. When the frequency of the AC voltage reference Ug* is 50 hertz or 60 hertz, for example, the voltage detection filter 22 removes a noise component (e.g., the frequency component equal to or higher than 100 hertz) from the bus voltage Vpn1. Hereinafter, the bus voltage Vpn1 having a noise removed by the voltage detection filter 22 is referred to as a bus voltage Vpn2.

1.2.3. Inverter Controlling Unit 23

The inverter controlling unit 23 generates gate signals S1 to S4 based on the bus voltage Vpn2, the power source voltage Vin, and the AC voltage reference Ug*. The inverter controlling unit 23 includes a voltage correcting unit 51 and a carrier comparing unit 52, as illustrated in FIG. 2.

The voltage correcting unit 51 obtains a modulation factor α1 by correcting the AC voltage reference Ug* based on a reference voltage Vref and the bus voltage Vpn2. The voltage correcting unit 51 obtains the modulation factor α1 by, for example, performing the operation of following Equation (3). The reference voltage Vref is parameter set to the voltage correcting unit 51 in advance.

$$\alpha 1 = Ug^* \times \frac{Vref}{Vpn2} \quad (3)$$

If the absolute value of the AC voltage reference Ug* is equal to or lower than the power source voltage Vin, the carrier comparing unit 52 generates a PWM signal by comparing the modulation factor α1 with a carrier signal. If the AC voltage reference Ug* has a positive polarity, the carrier comparing unit 52 outputs the generated PWM signal as gate signals S1 and S4. If the AC voltage reference Ug* has a negative polarity, the carrier comparing unit 52 outputs the generated PWM signal as gate signals S2 and S3.

If the absolute value of the AC voltage reference Ug* is higher than the power source voltage Vin, the carrier comparing unit 52 outputs the gate signals S1 to S4 based on the polarity of the AC voltage reference Ug*. For example, if the AC voltage reference Ug* has a positive polarity, the carrier comparing unit 52 sets the gate signals S1 and S4 to the High level, and sets the gate signals S2 and S3 to the Low level. As a result, the single-phase inverter 11 is caused to output a positive voltage. If the AC voltage reference Ug* has a negative polarity, the carrier comparing unit 52 sets the gate signals S2 and S3 to the High level, and sets the gate signals S1 and S4 to the Low level. As a result, the single-phase inverter 11 is caused to output a negative voltage.

1.2.4. Booster Controlling Unit 24

If the absolute value of the AC voltage reference Ug* is equal to or lower than the power source voltage Vin, the boosting controlling unit 24 outputs a Low-level gate signal S5 and a High-level gate signal S6. The gate signal S5 switches OFF the switching element Q5, and the gate signal S6 switches ON the switching element Q6. The power source voltage Vin is therefore output to the single-phase inverter 11 via the reactor L1 and the switching element Q6.

If the absolute value of the AC voltage reference Ug* is higher than the power source voltage Vin, the boosting controlling unit 24 outputs such gate signals S5 and S6 that the bus voltage Vpn is adjusted based on the AC voltage reference Ug*. For example, the boosting controlling unit 24 generates a pair of PWM signals that are set to the High level and the Low level reversely to each other, based on the power source voltage Vin and the AC voltage reference Ug*. For example, the boosting controlling unit 24 generates PWM signals with a modulation factor α2 (=|Ug*|−Vin)/|Ug*|). The boosting controlling unit 24 outputs the generated pair of PWM signals as a pair of gate signals S5 and S6.

The boosting controlling unit 24 controls the boost circuit 10 to switch ON the switching elements Q5 and Q6 alternatingly during a period in which generated is a portion (an example of a first portion) of the output voltage ug of which the absolute value is higher than the power source voltage Vin. In this manner, even if the load on the power converter 2 becomes low or absent during the period in which generated is a portion of the output voltage ug of which the absolute value is higher than the power source voltage Vin, the charge at the capacitor C1 bringing up the bus voltage Vpn unnecessarily high can be released to the side of the solar cell 3 via the switching element Q6 and the reactor L1.

Figure 3:
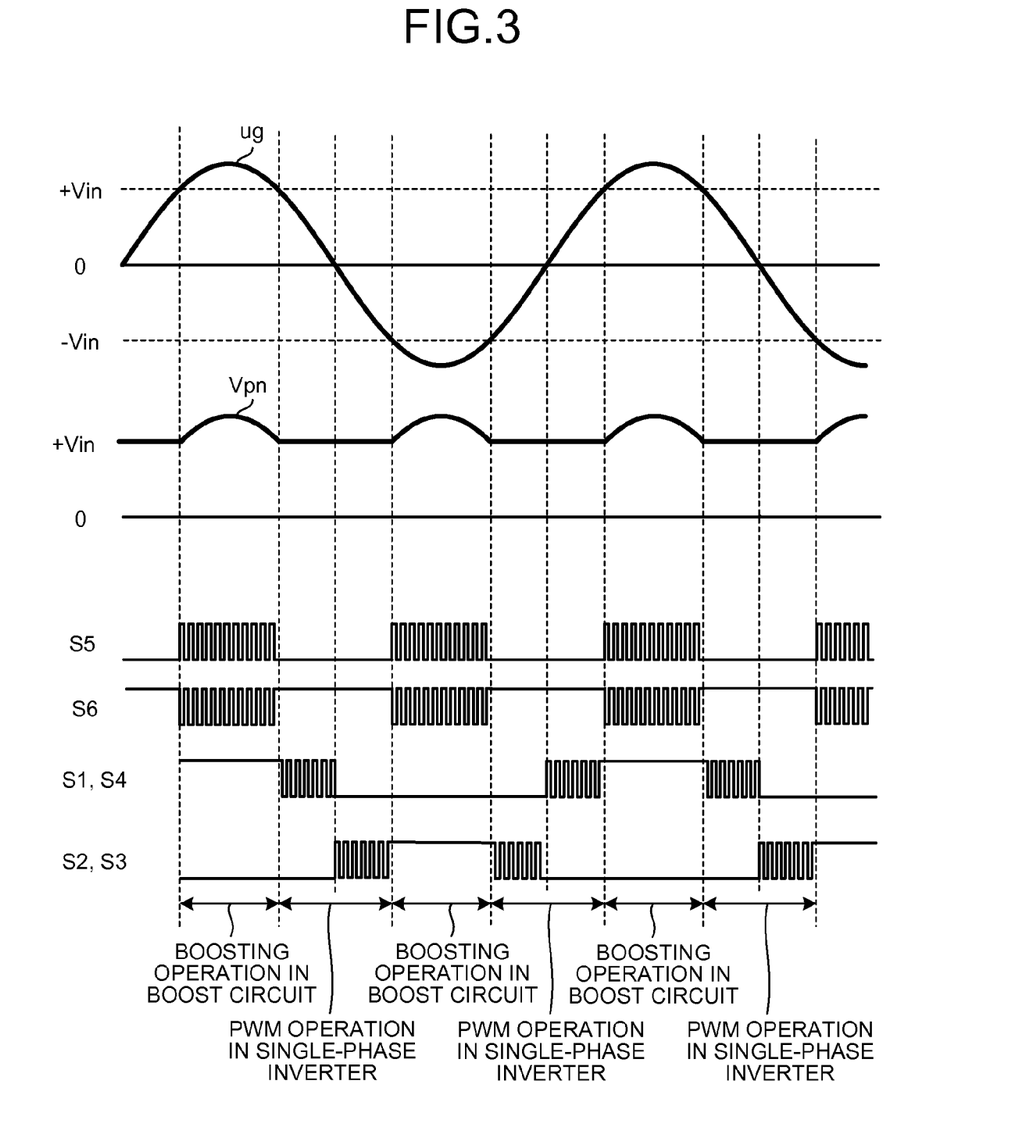
FIG. 3 is a schematic illustrating an example of a relation between gate signals output from the controller in the power converter, and an output voltage, and a bus voltage.

FIG. 3 is a schematic illustrating an example of a relation between the gate signals S1 to S6 output from the inverter controlling unit 23 and the boosting controlling unit 24, the output voltage ug, and the bus voltage Vpn. As illustrated in FIG. 3, if the absolute value of the AC voltage reference Ug* is equal to or lower than the power source voltage Vin, the power converter 2 outputs a voltage based on the AC voltage reference Ug*, by not causing the boost circuit 10 to perform the boosting operation, but by causing the single-phase inverter 11 to perform the PWM operation. For example, the inverter controlling unit 23 causes the single-phase inverter 11 to output a positive voltage by switching ON one of the switching elements Q1 and Q4, and switching ON and OFF the other. The inverter controlling unit 23 causes the single-phase inverter 11 to output a negative voltage by switching ON one of the switching elements Q2 and Q3, and switching ON and OFF the other. In this manner, the portion (an example of a second portion) of the output voltage ug of which the absolute value is lower than the power source voltage Vin is generated.

If the absolute value of the AC voltage reference Ug* is higher than the power source voltage Vin, the power converter 2 causes the boost circuit 10 to perform the boosting operation, and does not cause the single-phase inverter 11 to perform the PWM operation. This boosting operation allows the power converter 2 to output a bus voltage Vpn based on the AC voltage reference Ug* to the electrical grid 4 via the single-phase inverter 11. In this manner, the portion of the output voltage ug of which the absolute value of the AC voltage reference Ug* is higher than the power source voltage Vin is generated.

1.2.5. Detected Voltage Modifying Unit 25

When the control is switched from the boosting operation in the boost circuit 10 to the PWM operation in the single-phase inverter 11, the detected voltage modifying unit 25 modifies the output from the voltage detection filter 22 based on a delay compensating value Vcmp for compensating a detection delay in the voltage detection filter 22. In this manner, a distortion in the output voltage ug to be output from the single-phase inverter 11 can be suppressed, the distortion being a result of switching the control from the boosting operation to the inverter operation.

Figure 4:
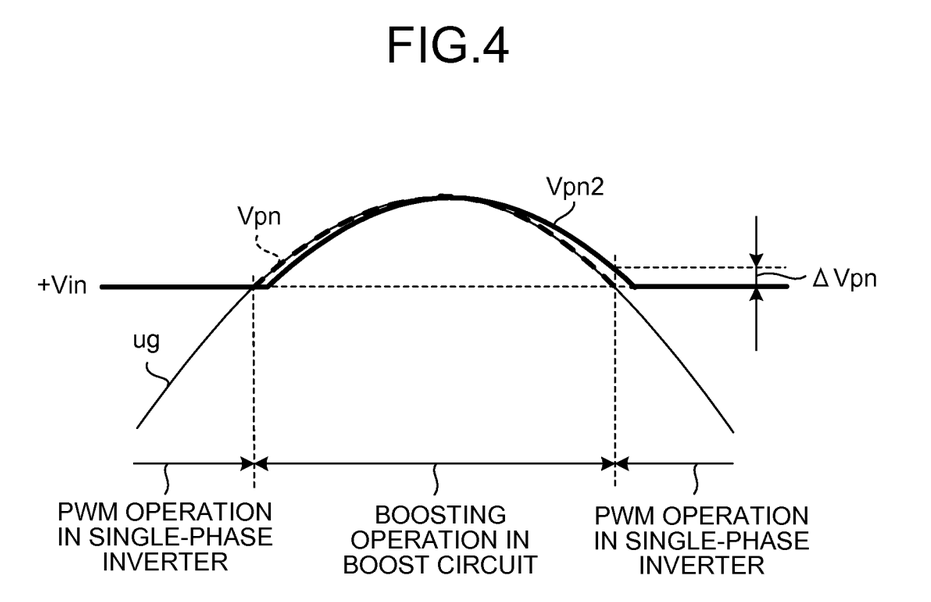
FIG. 4 is a schematic illustrating a detection delay introduced in a voltage detection filter.
Figure 5:
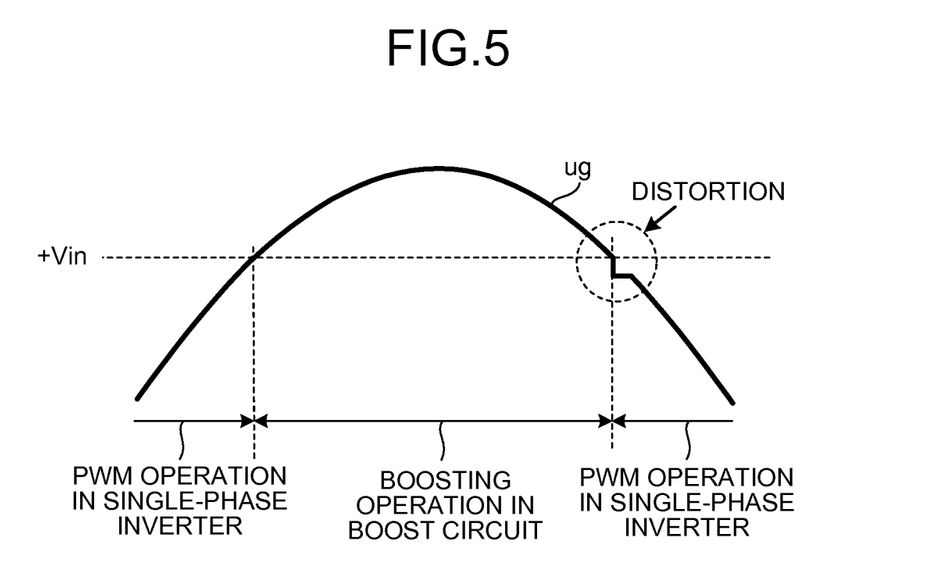
FIG. 5 is a schematic illustrating a distortion in the output voltage resulting from the detection delay.

The detected voltage modifying unit 25 will now be explained specifically. FIG. 4 is a schematic illustrating a detection delay in the voltage detection filter 22. FIG. 5 is a schematic illustrating a distortion in the output voltage resulting from the detection delay.

If the boosted voltage from the boost circuit 10 is constant, the bus voltage Vpn is then a DC voltage, so the output voltage is not affected very much by the detection delay in the voltage detection filter 22. In the power converter 2 according to the embodiment, however, the boost circuit 10 is used to generate a part of the AC output voltage ug in which the absolute value of the AC voltage reference Ug* is higher than the power source voltage Vin.

The voltage detection filter 22 has some detection delay. Therefore, if there is a change in the bus voltage Vpn during the period of the boosting control, a change in the bus voltage Vpn2 is delayed as well, as illustrated in FIG. 4. As a result, when the control is switched from the boosting operation in the boost circuit 10 to the PWM operation in the single-phase inverter 11, the bus voltage Vpn2 output from the voltage detection filter 22 includes some error ΔVpn.

Because the inverter controlling unit 23 performs the PWM control based on the bus voltage Vpn2, when the control is switched from the boosting operation in the boost circuit 10 to the PWM operation in the single-phase inverter 11, the output voltage ug changes abruptly due to the error ΔVpn, as illustrated in FIG. 5, and the output voltage ug becomes distorted. While it may be possible to switch ON the filtering function of the voltage detection filter 22 only in the period of the PWM operation in the single-phase inverter 11, the bus voltage Vpn2 would still have the error ΔVpn. The resultant output voltage ug therefore becomes distorted as well, in the same manner as when the filtering function of the voltage detection filter 22 is always kept ON.

To address this issue, the detected voltage modifying unit 25 modifies the output from the voltage detection filter 22 based on the delay compensating value Vcmp for compensating the detection delay in the voltage detection filter 22, when the control is switched from the boosting operation in the boost circuit 10 to the PWM operation in the single-phase inverter 11.

The detected voltage modifying unit 25 calculates an estimated bus voltage Vpn^ by estimating a voltage drop ΔV in the boost circuit 10 based on the power source current Iin, for example, and adding the voltage drop ΔV to the power source voltage Vin. The detected voltage modifying unit 25 outputs the estimated bus voltage Vpn^ as the delay compensating value Vcmp.

As illustrated in FIG. 2, the detected voltage modifying unit 25 includes a bus voltage estimating unit 61 and a replacing unit 62. The bus voltage estimating unit 61 obtains the estimated bus voltage Vpn^ by estimating the voltage drop ΔV based on the output voltage ug, the power source voltage Vin, and the like.

Assuming that the input power and the output power are equal, a relation between the power source voltage Vin and the power source current Iin, and the output voltage ug and the output current ig can be expressed as following Equation (4).

$$I_{in} \times V_{in} = i_g \times u_g \quad (4)$$

Based on Equation (4), following Equation (5) is established.

$$I_{in} = (i_g \times u_g)/V_{in} \quad (5)$$

In the period in which the boosting operation is not performed by the boost circuit 10, the voltage drop ΔV in the boost circuit 10 can be expressed as following Equation (6). In following Equation (6), "$R_L$" denotes the resistance component of the reactor L1, and "$R_{SW}$" denotes the ON resistance of the switching element Q6.

$$\Delta V = I_{in} \times (R_L + R_{SW}) \quad (6)$$

Based on Equations (5) and (6) above, the voltage drop ΔV in the boost circuit 10 can be expressed as following Equation (7).

$$\Delta V = (R_L + R_{SW}) \times (u_g \times i_g)/V_{in} \quad (7)$$

Because the bus voltage Vpn is a voltage resulting from adding the voltage drop ΔV to the power source voltage Vin, as indicated by following Equation (8), the bus voltage Vpn can be estimated from the power source voltage Vin and the voltage drop ΔV.

$$V_{pn} = V_{in} + \Delta V \quad (8)$$

The bus voltage estimating unit 61 stores therein the resistance component $R_L$ of the reactor L1 and the ON resistance $R_{SW}$ of the switching element Q6 as parameters. The bus voltage estimating unit 61 estimates the voltage drop ΔV by performing the operation of Equation (7) using these parameters, and obtains the estimated bus voltage Vpn^ by adding the estimated voltage drop ΔV to the power source voltage Vin.

Figure 6:
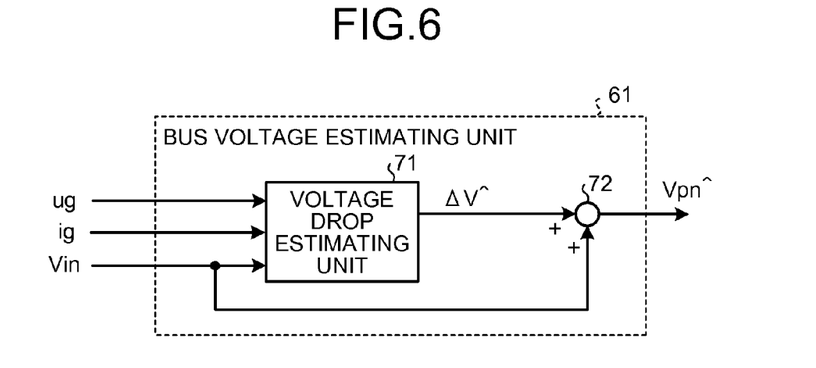
FIG. 6 is a schematic illustrating an example of a configuration of a bus voltage estimating unit.

FIG. 6 is a schematic illustrating an example of a configuration of the bus voltage estimating unit 61. As illustrated in FIG. 6, the bus voltage estimating unit 61 includes a voltage drop estimating unit 71 and an adder 72. The voltage drop estimating unit 71 obtains an estimated voltage drop ΔV^ that is an estimation of the voltage drop ΔV by performing the operation of Equation (7) above based on the power source voltage Vin, the output voltage ug, and the output current ig. The adder 72 obtains the estimated bus voltage Vpn^ by adding the estimated voltage drop ΔV^ to the power source voltage Vin.

The bus voltage estimating unit 61 may also obtain the estimated voltage drop ΔV^ by performing the operation of Equation (6) above using the parameters mentioned above, and obtain the estimated bus voltage Vpn^ by adding the estimated voltage drop ΔV^ to the power source voltage Vin.

The replacing unit 62 outputs the estimated bus voltage Vpn^ calculated by the bus voltage estimating unit 61 to the voltage detection filter 22 as the delay compensating value Vcmp at the timing at which the switching signal Sw is switched from the High level to the Low level. In this manner, the output from the voltage detection filter 22 is modified based on the estimated bus voltage Vpn^.

Let us assume herein that, as an example, the voltage detection filter 22 is a first-order digital low-pass filter. In such a case, a relation between the bus voltage Vpn1 and the bus voltage Vpn2 that are respectively the input to and the output from the voltage detection filter 22 can be expressed as following Equation (9).

$$V_{pn2} = \{1/(1+Ts)\} \times V_{pn1} \quad (9)$$

Discretizing Equation (9) above with $s=(1-Z^{-1})/ts$, Equation (9) can be expressed as following Equation (10).

$$Vpn2(k)=\{ts/(ts+T)\}(Vpn1(k)-Vpn2(k-1))\times Vpn2(k-1) \quad (10)$$

As one can see from Equation (10), assuming that the latest input voltage Vpn1(k) is equal to a previous output voltage Vpn2(k−1), Vpn2(k)=Vpn2(k−1) is established. The latest output voltage Vpn2(k), therefore, converges into the previous output voltage Vpn2(k−1).

As illustrated in FIG. 3, in the period in which the PWM operation is performed in the single-phase inverter 11, the bus voltage Vpn remains constant. After the switching signal Sw is switched from the High level to the Low level, therefore, the bus voltage Vpn1 output from the bus voltage detector 17 remains constant.

The replacing unit 62 therefore replaces the previous output voltage Vpn2(k−1) from the voltage detection filter 22 with the delay compensating value Vcmp, at the timing at which the switching signal Sw is switched from the High level to the Low level.

In this manner, the bus voltage Vpn2 output from the voltage detection filter 22 is modified as a voltage corresponding to the estimated bus voltage Vpn^, and the inverter controlling unit 23 can control the single-phase inverter 11 based on the bus voltage Vpn2 having corrected with the detection delay. It is therefore possible to suppress the distortion in the output voltage ug from the single-phase inverter 11, when the control is switched from the boosting operation in the boost circuit 10 to the PWM operation in the single-phase inverter 11.

The voltage detection filter 22 is not limited to a first-order digital low-pass filter. For example, the voltage detection filter 22 may be an n-th order digital low-pass filter (where n is an integer equal to or larger than two), or any other digital filter.

The replacing unit 62 is explained to replace the previous output voltage Vpn2(k−1) with the delay compensating value Vcmp, as an internal value of the voltage detection filter 22, but the internal value used in the replacement is not limited to the previous output voltage Vpn2(k−1). For example, the replacing unit 62 may have a function or a configuration for modifying any internal value of the voltage detection filter 22, the internal value being capable of compensating the detection delay, based on the delay compensating value Vcmp.

1.3. Process Performed by Controller 20

Figure 7:
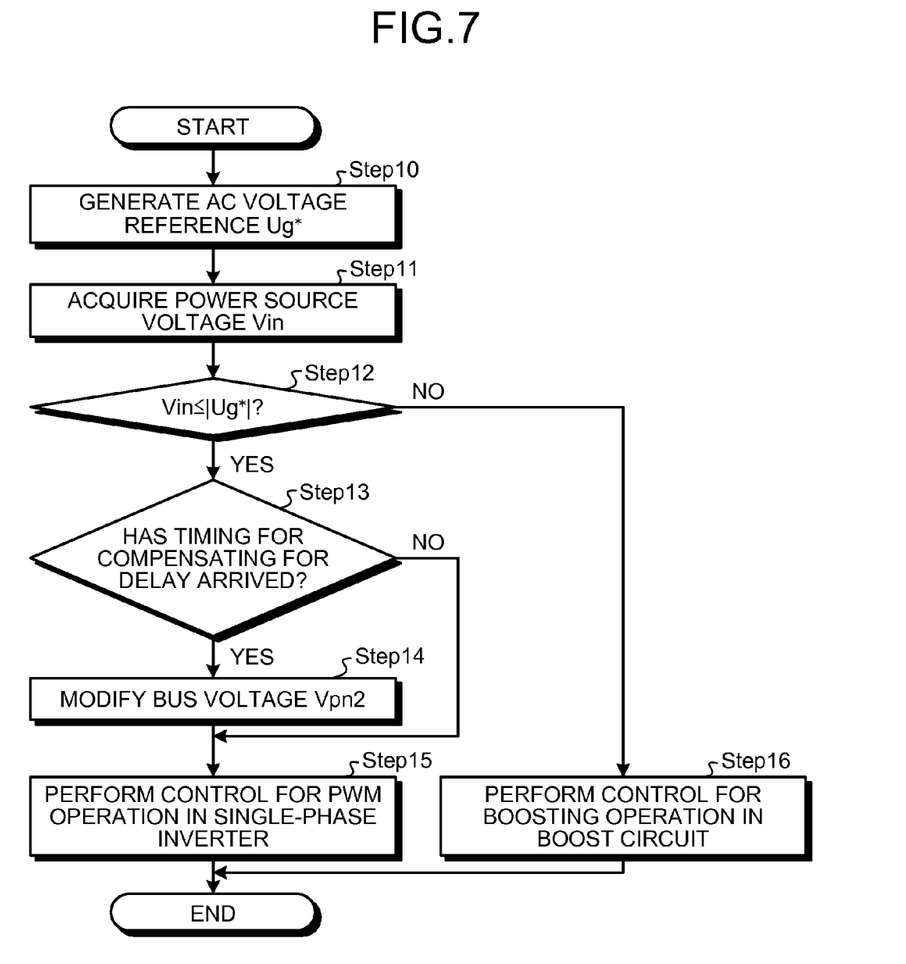
FIG. 7 is a flowchart of an example of a control process performed by the controller.

FIG. 7 is a flowchart of an example of the control process performed by the controller 20. The controller 20 repeats the control process illustrated in FIG. 7 at a given cycle.

As illustrated in FIG. 7, the controller 20 generates the AC voltage reference Ug* (Step 10), and obtains the detected power source voltage Vin from the output voltage detector 16 (Step 11).

The controller 20 then determines if the absolute value of the AC voltage reference Ug* is equal to or lower than the power source voltage Vin (Step 12). If the absolute value of the AC voltage reference Ug* is determined to be equal to or lower than the power source voltage Vin (Yes at Step 12), the controller 20 further determines if timing for compensating a delay has arrived (Step 13).

At the timing when the absolute value of the AC voltage reference Ug* switches from a value higher than the power source voltage Vin to a value equal to or lower than the power source voltage Vin, the controller 20 determines that the timing for compensating a delay has arrived at Step 13. If the controller 20 determines that the timing for compensating a delay has arrived (Yes at Step 13), the controller 20 generates the delay compensating value Vcmp, and modifies the bus voltage Vpn2 based on the delay compensating value Vcmp (Step 14).

If the process at Step 14 is completed, or if the controller 20 determines that the timing for compensating a delay has not arrived yet (No at Step 13), the controller 20 generates the gate signals S1 to S4 based on the bus voltage Vpn2 and the AC voltage reference Ug*, and performs the control for the PWM operation in the single-phase inverter 11 (Step 15).

If the controller 20 determines that the absolute value of the AC voltage reference Ug* is not equal to or lower than the power source voltage Vin at Step 12 (No at Step 12), the controller 20 generates the gate signals S5 and S6 based on the AC voltage reference Ug*, and performs the control for the boosting operation in the boost circuit 10 (Step 16).

In the manner described above, the power converter 2 according to the first embodiment modifies the output from the voltage detection filter 22, based on the delay compensating value Vcmp for compensating the detection delay in the voltage detection filter 22, at the timing at which the control is switched from the boosting operation in the boost circuit 10 to the PWM operation in the single-phase inverter 11. This configuration enables a distortion in the output voltage ug output from the single-phase inverter 11 to be suppressed even in a circuitry performing the control for the boosting operation in the boost circuit 10 and for the PWM-operation in the single-phase inverter 11 alternatingly so that the single-phase inverter 11 outputs an AC voltage.

2. Second Embodiment

A power converter in a power generating system according to a second embodiment will now be explained. The power generating system according to the second embodiment has the same configuration as that of the power generating system 1 except for the configuration of the detected voltage modifying unit. Therefore, illustrations and explanations thereof are omitted herein, and the elements having the same function as those in the power converter 2 are assigned with the same reference numerals, and redundant explanations thereof are omitted herein.

Figure 8:
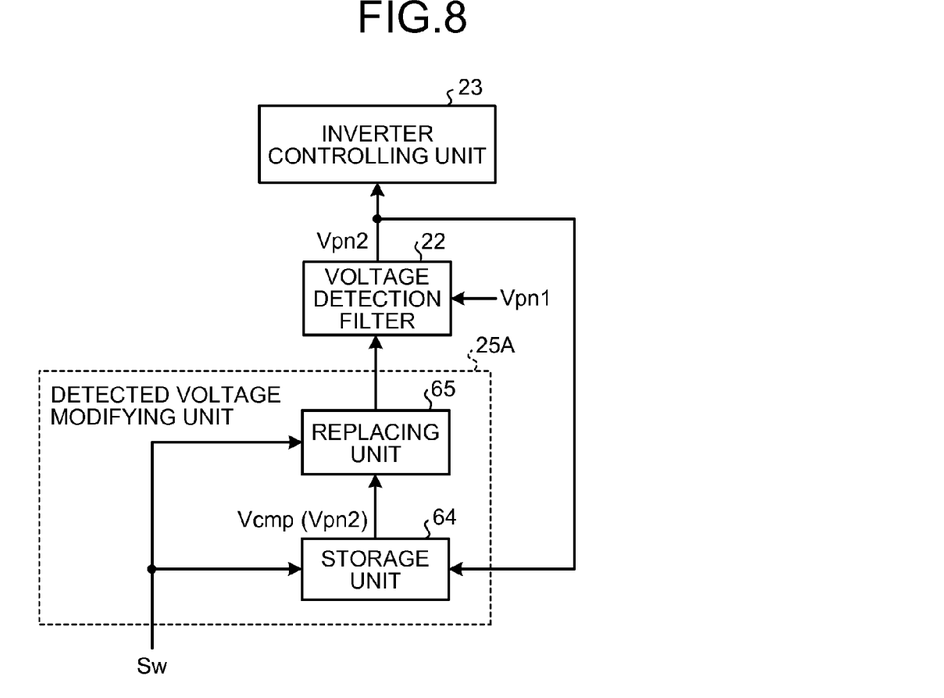
FIG. 8 is a schematic illustrating an example of a configuration of a detected voltage modifying unit according to a second embodiment.

FIG. 8 is a schematic illustrating a configuration of the detected voltage modifying unit according to the second embodiment. As illustrated in FIG. 8, this detected voltage modifying unit 25A includes a storage unit 64 and a replacing unit 65.

The storage unit 64 (an example of a retaining unit) stores therein to retain the bus voltage Vpn2 output from the voltage detection filter 22 immediately before the switching signal Sw is switched from the Low level to the High level, and outputs the stored bus voltage Vpn2 to the replacing unit 65 as the delay compensating value Vcmp.

The replacing unit 65 replaces the previous output voltage Vpn2(k−1) from the voltage detection filter 22 with the delay compensating value Vcmp, at the timing at which the switching signal Sw is switched from the High level to the Low level.

Immediately before the switching signal Sw is switched from the Low level to the High level, the bus voltage Vpn is a stable DC voltage, and the bus voltage Vpn2 output from the voltage detection filter 22 has noise removed by the voltage detection filter 22.

Therefore, by replacing the previous output voltage Vpn2(k−1) from the voltage detection filter 22 with the delay compensating value Vcmp, using the bus voltage Vpn2 immediately before the switching signal Sw is switched from the Low level to the High level as the delay compensating value Vcmp, a distortion in the output voltage ug can be suppressed accurately.

In the period in which the bus voltage Vpn is a stable DC voltage, the bus voltage Vpn2 to be stored in the storage unit 64 does not need to be the bus voltage Vpn2 immediately before the switching signal Sw is switched from the Low level to the High level. The storage unit 64 may store therein the bus voltage Vpn2 output from the voltage detection filter 22 at the timing at which a predetermined period has elapsed from when the switching signal Sw is switched from the High level to the Low level, for example. The timing at which the storage unit 64 stores therein the bus voltage Vpn2 can be specified as a parameter.

3. Third Embodiment

A power converter in a power generating system according to a third embodiment will now be explained. The power generating system according to the third embodiment has the same configuration as that of the power generating system 1 except for the configuration of the detected voltage modifying unit. Therefore, illustrations and explanations thereof are omitted herein, and the elements having the same function as those in the power converter 2 are assigned with the same reference numerals, and redundant explanations thereof are omitted herein.

Figure 9:
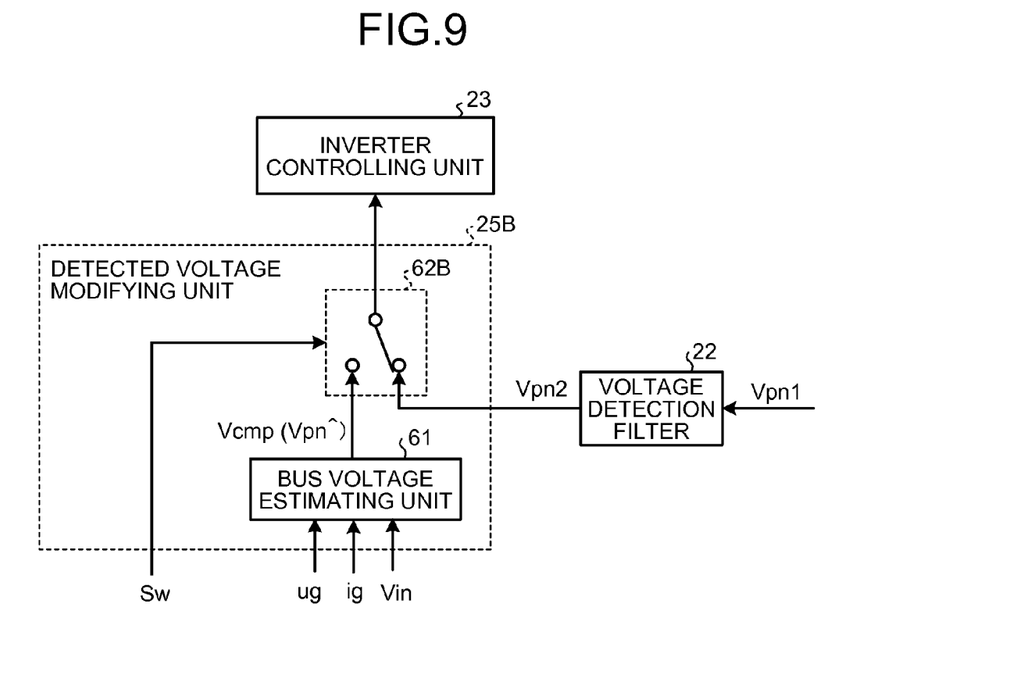
FIG. 9 is a schematic illustrating an example of a configuration of a detected voltage modifying unit according to a third embodiment.

FIG. 9 is a schematic illustrating a configuration of the detected voltage modifying unit according to the third embodiment. As illustrated in FIG. 9, this detected voltage modifying unit 25B includes the bus voltage estimating unit 61 and a replacing unit 62B.

If the switching signal Sw is set to the High level, the replacing unit 62B outputs the bus voltage Vpn2 received from the voltage detection filter 22 to the inverter controlling unit 23. In a period until a predetermined condition is satisfied from the timing at which the switching signal Sw is switched from the High level to the Low level, the replacing unit 62B outputs the estimated bus voltage Vpn^ estimated by the bus voltage estimating unit 61 to the inverter controlling unit 23 as the delay compensating value Vcmp. As a result, the output from the voltage detection filter 22 is modified based on the estimated bus voltage Vpn^.

The period for which the replacing unit 62B keeps outputting the delay compensating value Vcmp to the inverter controlling unit 23 is a predetermined period, and is set to a period equal to or longer than the period in which the bus voltage Vpn2 becomes substantially equal to the bus voltage Vpn, for example. Given such a condition, when the predetermined period elapses, the replacing unit 62B switches the output to the inverter controlling unit 23 from the delay compensating value Vcmp to the bus voltage Vpn2.

As another example, the period for which the replacing unit 62B keeps outputting the delay compensating value Vcmp to the inverter controlling unit 23 may also be specified as a period until the amount of change in the output from the voltage detection filter 22 becomes equal to or smaller than a predetermined amount. Given such a condition, the replacing unit 62B calculates the amount of change in the bus voltage Vpn2, for example, and switches the output to the inverter controlling unit 23 from the delay compensating value Vcmp to the bus voltage Vpn2 when the amount of change becomes equal to or smaller than the predetermined amount.

As another example, the period for which the replacing unit 62B keeps outputting the delay compensating value Vcmp to the inverter controlling unit 23 may also be specified as a period until the difference between the bus voltage Vpn2 and the estimated bus voltage Vpn^ becomes equal to or smaller than a predetermined value. Given such a condition, the replacing unit 62B calculates the difference between the bus voltage Vpn2 and the estimated bus voltage Vpn^, for example, and switches the output to the inverter controlling unit 23 from the delay compensating value Vcmp to the bus voltage Vpn2 when the difference becomes equal to or smaller than the predetermined value.

In the manner described above, the power converter according to the third embodiment keeps the bus voltage Vpn2 replaced with the delay compensating value Vcmp for the period until a given condition is satisfied from when the control is switched from the boosting operation in the boost circuit 10 to the PWM operation in the single-phase inverter 11. In this manner, the distortion in the output voltage ug can be suppressed. The voltage detection filter 22 is not limited to a digital filter. The voltage detection filter 22 may also be an analog low-pass filter, for example.

4. Fourth Embodiment

A power converter in a power generating system according to a fourth embodiment will now be explained. The power generating system according to the fourth embodiment has the same configuration as that of the power generating system 1 except for the configuration of the detected voltage modifying unit. Therefore, illustrations and explanations thereof are omitted herein, and the elements having the same function as those in the power converter 2 are assigned with the same reference numerals, and redundant explanations thereof are omitted herein.

Figure 10:
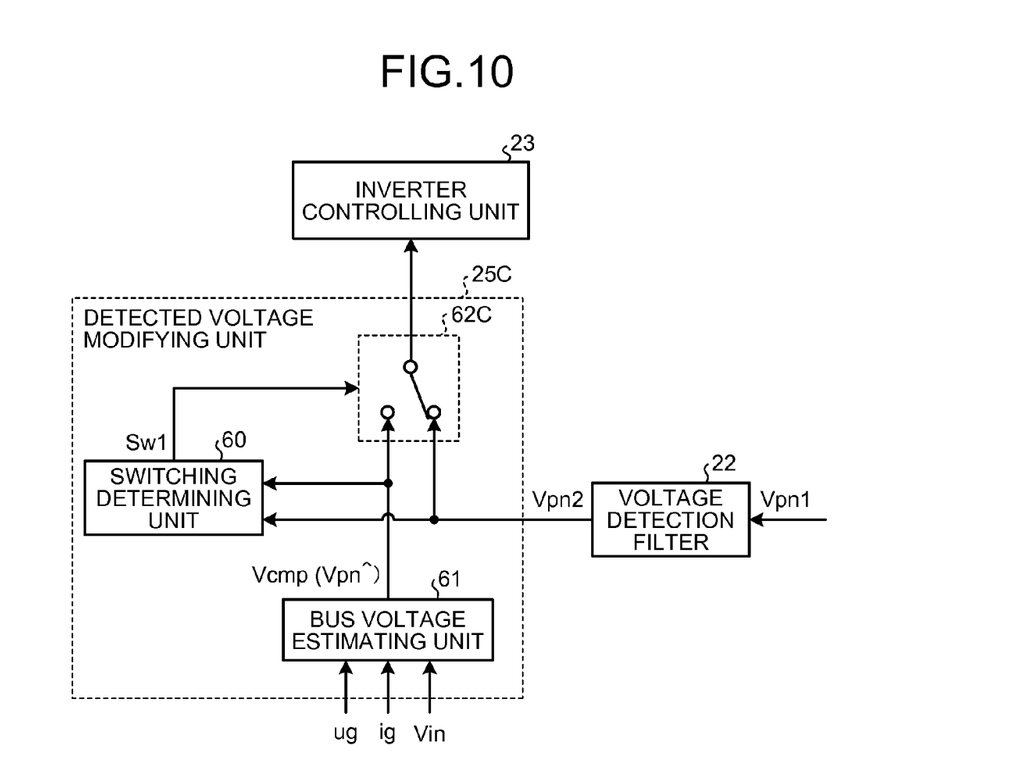
FIG. 10 is a schematic illustrating a configuration of a detected voltage modifying unit according to a fourth embodiment.

FIG. 10 is a schematic illustrating a configuration of the detected voltage modifying unit according to the fourth embodiment. As illustrated in FIG. 10, this detected voltage modifying unit 25C includes a switching determining unit 60, the bus voltage estimating unit 61, and a replacing unit 62C.

The switching determining unit 60 outputs a High-level switching signal Sw1 when the difference between the bus voltage Vpn2 and the estimated bus voltage Vpn^ is equal to or smaller than a predetermined value, and outputs a Low-level switching signal Sw1 when the difference between the bus voltage Vpn2 and the estimated bus voltage Vpn^ is larger than the predetermined value.

If the switching signal Sw1 output from the switching determining unit 60 is set to the High level, the replacing unit 62C outputs the bus voltage Vpn2 to the inverter controlling unit 23. If the switching signal Sw1 output from the switching determining unit 60 is set to the Low level, the replacing unit 62C outputs the estimated bus voltage Vpn^ estimated by the bus voltage estimating unit 61 to the inverter controlling unit 23 as the delay compensating value Vcmp.

At the timing at which the control is switched from the boosting operation in the boost circuit 10 to the PWM operation in the single-phase inverter 11, the difference between the bus voltage Vpn2 and the estimated bus voltage Vpn^ becomes larger than a predetermined value. Therefore, by causing the replacing unit 62C to replace the bus voltage Vpn2 with the delay compensating value Vcmp at the timing at which the control is switched from the boosting operation in the boost circuit 10 to the PWM operation in the single-phase inverter 11, the distortion in the output voltage ug can be suppressed. The voltage detection filter 22 is not limited to a digital filter. The voltage detection filter 22 may also be an analog low-pass filter, for example.

5. Fifth Embodiment

A power converter in a power generating system according to a fifth embodiment will now be explained. The power generating system according to the fifth embodiment has the same configuration as that of the power generating system 1 except for the configuration of the detected voltage modifying unit. Therefore, illustrations and explanations thereof are omitted herein, and the elements having the same function as those in the power converter 2 are assigned with the same reference numerals, and redundant explanations thereof are omitted herein.

Figure 11:
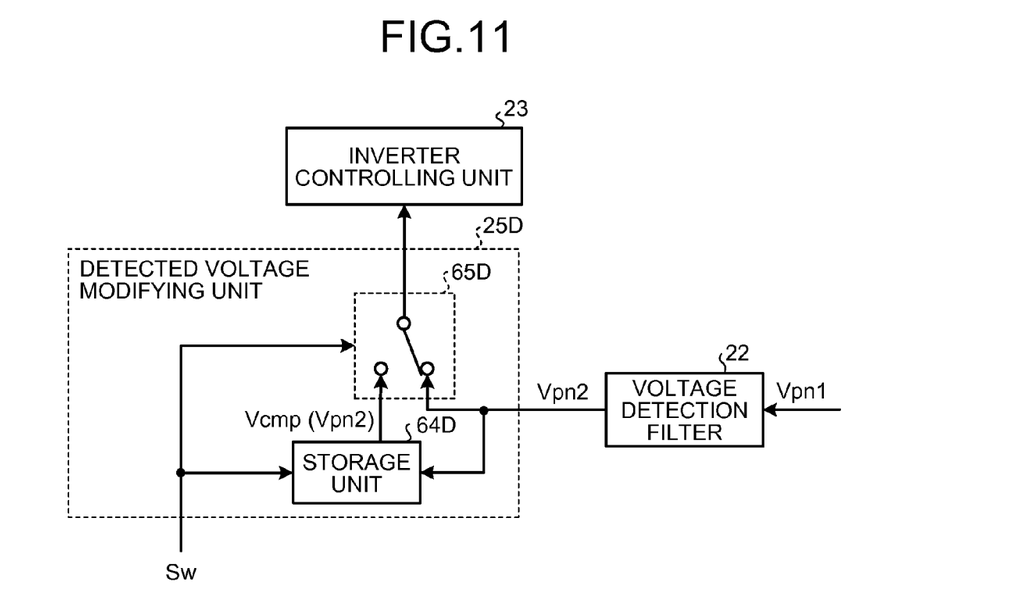
FIG. 11 is a schematic of a configuration of a detected voltage modifying unit according to a fifth embodiment.

FIG. 11 is a schematic illustrating a configuration of the detected voltage modifying unit according to the fifth embodiment. As illustrated in FIG. 11, this detected voltage modifying unit 25D includes a storage unit 64D and a replacing unit 65D.

The storage unit 64D (an example of the retaining unit) stores therein to retain the bus voltage Vpn2 output from the voltage detection filter 22 immediately before the switching signal Sw is switched from the Low level to the High level. The storage unit 64D outputs the stored bus voltage Vpn2 to the replacing unit 65D as the delay compensating value Vcmp.

The replacing unit 65D outputs the bus voltage Vpn2 received from the voltage detection filter 22 to the inverter controlling unit 23 when the switching signal Sw is set to the High level. The replacing unit 65D outputs the delay compensating value Vcmp received from the storage unit 64D to the inverter controlling unit 23 during the period until a predetermined condition is satisfied from the timing at which the switching signal Sw is switched from the High level to the Low level. "The period until a predetermined condition is satisfied" is the same as that in the detected voltage modifying unit 25C according to the third embodiment, for example.

In the manner described above, the power converter according to the fifth embodiment replaces the bus voltage Vpn2 with the delay compensating value Vcmp during the period until a given condition is satisfied from when the control is switched from the boosting operation in the boost circuit 10 to the PWM operation in the single-phase inverter 11. In this manner, the distortion in the output voltage ug can be suppressed. The voltage detection filter 22 is not limited to a digital filter. The voltage detection filter 22 may also be an analog low-pass filter, for example.

6. Sixth Embodiment

A power converter according to a sixth embodiment will now be explained. The power converter according to the sixth embodiment has the same configuration as the power converter according to any one of the first to the fifth embodiment except for the configuration of the reference generating unit. Therefore, illustrations and explanations thereof are partially omitted, and the elements having the same function as those in the power converter according to the first to the fifth embodiments are assigned with the same reference numerals, and redundant explanations thereof are omitted herein. To the single-phase inverter 11 in the power converter according to the sixth embodiment, an AC motor is connected, as another example, instead of the electrical grid 4.

Figure 12:
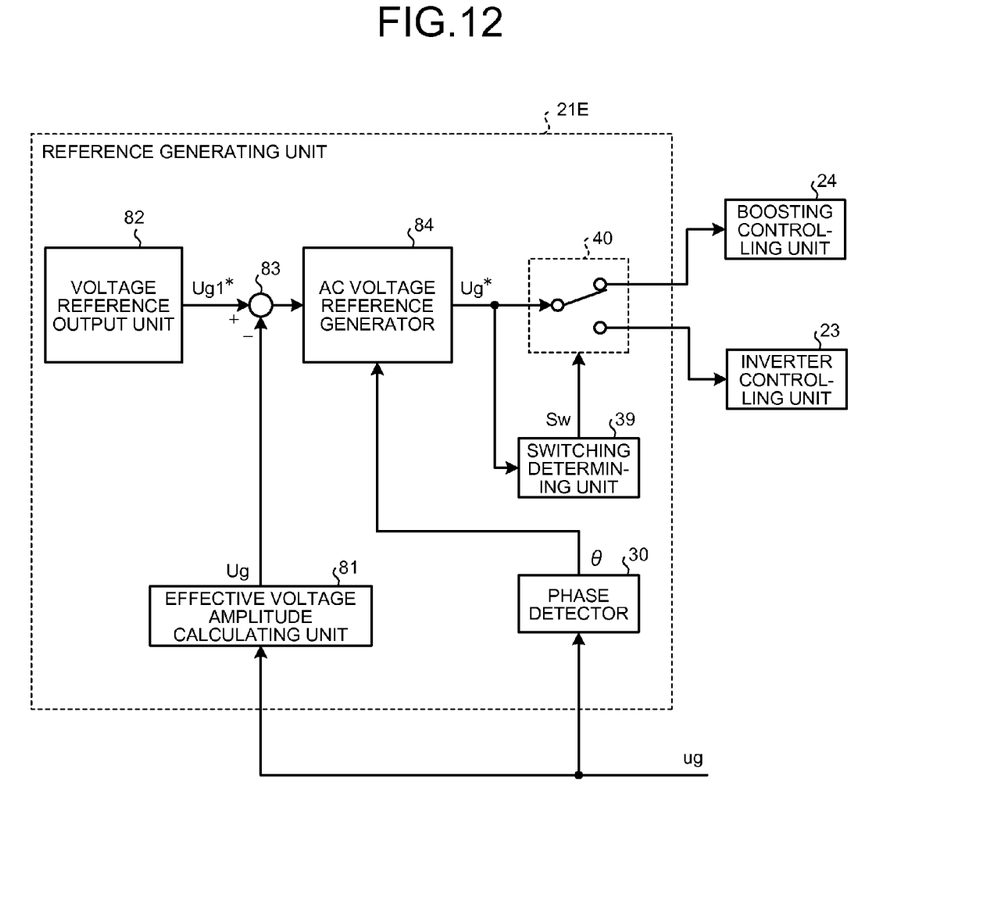
FIG. 12 is a schematic of a configuration of a reference generating unit according to a sixth embodiment.

FIG. 12 is a schematic of a configuration of the reference generating unit according to the sixth embodiment. As illustrated in FIG. 12, this reference generating unit 21E includes a phase detector 30, the switching determining unit 39, the switching unit 40, an effective voltage amplitude calculating unit 81, a voltage reference output unit 82, a subtractor 83, and an AC voltage reference generator 84.

The effective voltage amplitude calculating unit 81 calculates the effective amplitude Ug of the output voltage ug. The effective voltage amplitude calculating unit 81 obtains the effective amplitude Ug of the output voltage ug by, for example, calculating the amplitude of the output voltage ug, and multiplying $1/\sqrt{2}$ to the amplitude.

The voltage reference output unit 82 outputs a voltage reference Ug1* to the subtractor 83. The subtractor 83 calculates a deviation between the voltage reference Ug1* and the effective amplitude Ug of the output voltage ug, and outputs the deviation to the AC voltage reference generator.

The AC voltage reference generator 84 generates the AC voltage reference Ug* in such a manner that the deviation between the voltage reference Ug1* and the effective amplitude Ug becomes zero. For example, the AC voltage reference generator 84 includes, for example, a PI controller, and obtains the amplitude M of the AC voltage reference Ug* making the deviation between the voltage reference Ug1* and the effective amplitude Ug zero. The AC voltage reference generator 84 generates the AC voltage reference Ug* (=M×sin θ) based on the amplitude M and the output voltage phase θ. The AC voltage reference generator 84 outputs the generated AC voltage reference Ug* to the switching unit 40 or to the switching determining unit 39.

In the manner described above, the power converter according to the sixth embodiment can generate the AC voltage reference Ug* based on the voltage reference Ug1*, and is capable of operating autonomously. Therefore, even when an AC motor is connected to the single-phase inverter 11, a power converter capable of suppressing the distortion in the output voltage ug can be provided.

7. Others

In the first to the fifth embodiments described above, the process of generating the AC voltage reference Ug* can be performed easily because the voltage reference can be generated using scalar quantities of the d-axis component and the q-axis component. However, the AC voltage reference Ug* may also be generated using vector quantities only.

Furthermore, explained in the embodiments described above is an example in which the control is switched between the boosting operation in the boost circuit 10 and the PWM operation in the single-phase inverter 11 based on whether the absolute value of the AC voltage reference Ug* is equal to or lower than the power source voltage Vin. However, the condition for switching the control between the boosting operation in the boost circuit 10 and the PWM operation in the single-phase inverter 11 is not limited to the example described above.

For example, considering the voltage drop ΔV resulting from the resistance component of the reactor L1 and the ON resistance of the switching element Q6, the control may be switched between the boosting operation in the boost circuit 10 and the PWM operation in the single-phase inverter 11 based on whether the AC voltage reference Ug* is equal to or lower than a predetermined voltage Vsw (<Vin). The predetermined voltage Vsw is, for example, Vin+ΔV. In the period in which Vsw1 (<Vin)<Ug*<Vsw2 (>Vin), the boosting operation in the boost circuit 10 and the PWM operation in the single-phase inverter 11 may be performed simultaneously.

In the embodiments described above, the bus voltage detector 17 is explained to detect the instantaneous value of the bus voltage Vpn, but the bus voltage detector 17 may also use a voltage divider to step-down the bus voltage Vpn at a predetermined ratio, and output the resultant voltage, for example. Given such a detector, the voltage detection filter 22 converts the voltage output from the bus voltage detector 17 into a digital signal using an analog-to-digital (A/D) converter, and removes the noise from the digital signal with a filter.

Furthermore, in the embodiments described above, the switching elements Q1 to Q4, the switching elements Q5 and Q6, or both sets are made of a wide-bandgap semiconductor containing gallium nitride (GaN) or silicon carbide (SiC). Therefore, changes in the grid impedance or in the load connected to the output of the power converter 2 can be actively compensated.

In the embodiments described above, the voltage detection filter 17 is used as an example of means for processing (hereinafter, referred to as processing means) the detection result from the bus voltage detector 17. However, the processing means is not limited to the voltage detection filter 17, and may be any means for processing the detection result and introducing a delay. Furthermore, in the embodiments described above, the detected voltage modifying units 25, 25A, 25B, 25C, 25D are used as examples of means for suppressing (hereinafter, referred to as suppressing means) the distortion in the AC voltage resulting from the processing of the processing means. However, the suppressing means is not limited to the detected voltage modifying units 25, 25A, 25B, 25C, 25D, and may be any means for suppressing the distortion in the AC voltage resulting from the processing by the suppressing means.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A power converter comprising:
 a boost circuit that boosts a voltage of a direct-current (DC) power source;
 a single-phase inverter that converts a voltage output from the boost circuit into an alternating-current (AC) voltage; and
 a controller that switches between a boosting operation in the boost circuit and a pulse-width modulation (PWM) operation in the single-phase inverter,
 the controller includes:
  a voltage detection filter that removes a noise component from a detection result of a voltage detector detecting the output voltage of the boost circuit; and
  a detected voltage modifying unit that modifies an output from the voltage detection filter based on a delay compensating value for compensating a detection delay introduced by the voltage detection filter, when switching is performed from the boosting operation in the boost circuit to the PWM operation in the single-phase inverter.

2. The power converter according to claim 1, wherein the controller further includes:
 a reference generating unit that generates an AC voltage reference for an AC voltage output from the single-phase inverter to a load;
 a boosting controlling unit that performs, when an absolute value of the AC voltage reference is higher than the voltage of the DC power source, control for the boosting operation in the boost circuit to generate a first portion of the AC voltage, the first portion corresponding to the AC voltage reference of which the absolute value is higher than the voltage of the DC power source; and
 an inverter controlling unit that performs, when the absolute value of the AC voltage reference is lower than the voltage of the DC power source, control for the PWM operation in the single-phase inverter to generate a second portion of the AC voltage based on the output of the voltage detection filter and the AC voltage reference, the second portion corresponding to the AC voltage reference of which the absolute value is lower than the voltage of the DC power source.

3. The power converter according to claim 1, wherein the detected voltage modifying unit includes:
 an estimating unit that estimates the output voltage of the boost circuit as the delay compensating value; and
 a replacing unit that replaces the output of the voltage detection filter or an internal value of the voltage detection filter with the delay compensating value, when switching is performed from the boosting operation in the boost circuit to the PWM operation in the single-phase inverter.

4. The power converter according to claim 3, wherein the estimating unit estimates the output voltage of the boost circuit based on a voltage and a current output from the single-phase inverter, and the voltage of the DC power source.

5. The power converter according to claim 1, wherein the detected voltage modifying unit includes:
 a storage unit that stores, as the delay compensating value, an output from the voltage detection filter before switching is performed from the PWM operation in the single-phase inverter to the boosting operation in the boost circuit; and
 a replacing unit that replaces the output of the voltage detection filter or an internal value of the voltage detection filter with the delay compensating value stored in the storage unit, when switching is performed from the boosting operation in the boost circuit to the PWM operation in the single-phase inverter.

6. The power converter according to claim 3, wherein
 the voltage detection filter is a digital filter that removes a noise component from a detection result of the voltage detector based on the detection result of the voltage detector and a previous output from the voltage detection filter, and
 the replacing unit replaces the previous output with the delay compensating value to modify the output of the voltage detection filter.

7. The power converter according to claim 3, wherein the replacing unit continuously replaces the output of the voltage detection filter with the delay compensating value until an amount of change of the output from the voltage detection filter becomes equal to or smaller than a predetermined amount, or until a predetermined period elapses from when switching is performed from the boosting operation in the boost circuit to the PWM operation in the single-phase inverter.

8. The power converter according to claim 1, wherein one set of switching elements of the boost circuit, one set of switching elements of the single-phase inverter, or both the sets are made of a wide-bandgap semiconductor containing gallium nitride (GaN) or silicon carbide (SiC).

9. A power generating system comprising:
the power converter according to claim 1; and
a power generator that supplies DC power to the power converter.

10. An apparatus for controlling a power converter, the apparatus comprising:
a voltage detection filter that removes a noise component from a detection result of a voltage at a connection point between a boost circuit boosting a voltage of a direct-current (DC) power source and a single-phase inverter converting a voltage output from the boost circuit into an alternating-current (AC) voltage; and
a detected voltage modifying unit that modifies an output from the voltage detection filter based on a delay compensating value for compensating a detection delay introduced by the voltage detection filter, when switching is performed from a boosting operation in the boost circuit to a pulse-width modulation (PWM) operation in the single-phase inverter.

11. An apparatus for controlling a power converter, the apparatus comprising:

means for processing a detection result of a voltage at a connection point between a boost circuit and a single-phase inverter, the boost circuit boosting a voltage of a direct-current (DC) power source, and the single-phase inverter converting a voltage output from the boost circuit into an alternating-current (AC) voltage; and means for suppressing a distortion in the AC voltage, the distortion resulting from a delay introduced by the means for processing when switching is performed from a boosting operation in the boost circuit to a pulse-width modulation (PWM) operation in the single-phase inverter.

12. A method for controlling a power converter, the method comprising:
detecting a voltage at a connection point between a boost circuit boosting a voltage of a direct-current (DC) power source and a single-phase inverter converting a voltage output from the boost circuit into an alternating-current (AC) voltage;
removing a noise component from the detected voltage with a voltage detection filter; and
modifying an output from the voltage detection filter based on a delay compensating value for compensating a detection delay introduced by the voltage detection filter, when switching is performed from a boosting operation in the boost circuit to a pulse-width modulation (PWM) operation in the single-phase inverter.

* * * * *